US012047367B2

(12) United States Patent
Panikkar et al.

(10) Patent No.: US 12,047,367 B2
(45) Date of Patent: Jul. 23, 2024

(54) SINGLE SIGN-ON SERVICES FOR DATABASE CLUSTERS

(71) Applicant: Dell Products L.P., Round Rock, TX (US)

(72) Inventors: Shibi Panikkar, Bangalore (IN); Pratheek Veluswamy, Bangalore (IN); Kwong Lung Yong, Cyberjaya (MY)

(73) Assignee: Dell Products L.P., Round Rock, TX (US)

( * ) Notice: Subject to any disclaimer, the term of this patent is extended or adjusted under 35 U.S.C. 154(b) by 425 days.

(21) Appl. No.: 17/488,522

(22) Filed: Sep. 29, 2021

(65) Prior Publication Data

US 2023/0099355 A1    Mar. 30, 2023

(51) Int. Cl.
H04L 9/40 (2022.01)
(52) U.S. Cl.
CPC .............. H04L 63/0815 (2013.01)
(58) Field of Classification Search
None
See application file for complete search history.

(56) References Cited

U.S. PATENT DOCUMENTS

| | | | | |
|---|---|---|---|---|
| 8,392,969 B1 * | 3/2013 | Park | G06Q 10/00 | 726/8 |
| 8,443,069 B2 * | 5/2013 | Bagepalli | H04L 63/0428 | 713/153 |
| 8,549,300 B1 * | 10/2013 | Kumar | H04L 9/3263 | 713/168 |
| 8,613,070 B1 * | 12/2013 | Borzycki | H04L 67/104 | 726/8 |
| 8,713,658 B1 * | 4/2014 | Tidd | H04L 63/0815 | 726/8 |
| 8,839,395 B2 * | 9/2014 | Poliashenko | G06F 21/41 | 713/172 |
| 9,300,660 B1 * | 3/2016 | Borowiec | H04L 63/08 | |
| 9,386,120 B2 * | 7/2016 | Borzycki | H04L 63/04 | |

(Continued)

OTHER PUBLICATIONS

Microsoft, "Azure SQL Database Serverless," https://azure.microsoft.com/en-us/resources/azure-sql-database-serverless-infographic/, 2020, 2 pages.

(Continued)

Primary Examiner — Kambiz Zand
Assistant Examiner — Mahabub S Ahmed
(74) Attorney, Agent, or Firm — Ryan, Mason & Lewis, LLP

(57) ABSTRACT

An apparatus comprises a processing device configured to receive, from a given client at a single sign-on manager coupled to a database cluster comprising a plurality of databases, an access request comprising an identifier of a given one of the plurality of databases in the database cluster and single sign-on credentials for the given client to access the database cluster. The processing device is also configured to authenticate, at the single sign-on manager, the single sign-on credentials in the access request and, responsive to authenticating the single sign-on credentials in the access request, to establish a connection between the given client and the given one of the plurality of databases in the database cluster utilizing a session established between the single sign-on manager and the given one of the plurality of databases in the database cluster.

20 Claims, 10 Drawing Sheets

(56) References Cited

U.S. PATENT DOCUMENTS

| | | | | |
|---|---|---|---|---|
| 9,432,355 | B2* | 8/2016 | Akella | G06F 21/41 |
| 9,866,640 | B2* | 1/2018 | Motukuru | H04L 67/148 |
| 9,887,981 | B2* | 2/2018 | Mathew | H04L 67/141 |
| 10,225,244 | B2* | 3/2019 | Manza | G06F 21/41 |
| 10,705,823 | B2* | 7/2020 | Pitre | H04L 41/5054 |
| 11,863,530 | B1* | 1/2024 | Sreekumar | H04L 63/0272 |
| 11,870,770 | B2* | 1/2024 | Lao | H04L 67/1095 |
| 2003/0163733 | A1* | 8/2003 | Barriga-Caceres | H04L 67/51 726/5 |
| 2003/0200465 | A1* | 10/2003 | Bhat | H04L 63/0815 726/8 |
| 2003/0212904 | A1* | 11/2003 | Randle | G06Q 20/04 705/64 |
| 2004/0250118 | A1* | 12/2004 | Andreev | H04L 63/0815 726/8 |
| 2005/0108521 | A1* | 5/2005 | Silhavy | G06F 21/6227 713/156 |
| 2007/0022087 | A1* | 1/2007 | Bahar | H04L 67/1001 |
| 2009/0164795 | A1* | 6/2009 | Justus | H04L 63/0815 726/8 |
| 2010/0242106 | A1* | 9/2010 | Harris | H04L 63/08 709/224 |
| 2011/0154443 | A1* | 6/2011 | Thakur | G06F 21/41 726/3 |
| 2011/0277026 | A1* | 11/2011 | Agarwal | H04L 63/0815 726/8 |
| 2011/0277027 | A1* | 11/2011 | Hayton | G06F 21/554 726/8 |
| 2011/0296522 | A1* | 12/2011 | Speyer | H04L 9/3228 726/20 |
| 2013/0227668 | A1* | 8/2013 | Mocanu | H04L 63/0823 726/8 |
| 2014/0143846 | A1* | 5/2014 | Tidd | H04L 63/0815 726/8 |
| 2014/0143847 | A1* | 5/2014 | Tidd | H04L 63/0815 726/8 |
| 2014/0181301 | A1* | 6/2014 | Yendluri | H04L 67/14 709/225 |
| 2014/0244447 | A1* | 8/2014 | Kim | G06Q 30/0643 705/27.2 |
| 2014/0298441 | A1* | 10/2014 | Yamaguchi | H04L 63/0815 726/8 |
| 2015/0088978 | A1* | 3/2015 | Motukuru | H04L 67/148 709/203 |
| 2015/0089614 | A1* | 3/2015 | Mathew | H04L 65/1069 726/7 |
| 2015/0371045 | A1* | 12/2015 | Boyer | G06F 21/57 726/1 |
| 2015/0381621 | A1* | 12/2015 | Innes | H04W 12/069 726/7 |
| 2016/0134619 | A1* | 5/2016 | Mikheev | H04L 63/0884 726/8 |
| 2016/0366119 | A1* | 12/2016 | Rykowski | G06F 21/41 |
| 2017/0155686 | A1* | 6/2017 | Yanacek | G06F 21/6218 |
| 2018/0026968 | A1* | 1/2018 | Canavor | H04L 63/0823 726/6 |
| 2018/0069702 | A1* | 3/2018 | Ayyadevara | H04W 12/069 |
| 2018/0075231 | A1* | 3/2018 | Subramanian | H04L 63/0807 |
| 2018/0077144 | A1* | 3/2018 | Gangawane | H04L 63/102 |
| 2018/0083835 | A1* | 3/2018 | Cole | H04L 67/51 |
| 2018/0083967 | A1* | 3/2018 | Subramanian | H04L 63/10 |
| 2018/0219854 | A1* | 8/2018 | Miran | H04L 63/0815 |
| 2018/0270290 | A1* | 9/2018 | Sinha | H04L 67/2871 |
| 2018/0278612 | A1* | 9/2018 | Pattar | H04L 63/061 |
| 2019/0014102 | A1* | 1/2019 | Mathew | G06F 21/41 |
| 2019/0166115 | A1* | 5/2019 | Manza | H04L 63/0815 |
| 2019/0207927 | A1* | 7/2019 | Lakhani | G06F 21/42 |
| 2019/0222568 | A1* | 7/2019 | Sridhar | H04L 9/30 |
| 2020/0007531 | A1* | 1/2020 | Koottayi | H04L 67/146 |
| 2020/0028823 | A1* | 1/2020 | Mukhopadhyay | G06F 21/33 |
| 2020/0250664 | A1* | 8/2020 | Kumar | H04L 63/0838 |
| 2020/0285546 | A1* | 9/2020 | Kraplanee | G06F 21/6245 |
| 2021/0240460 | A1* | 8/2021 | Hahn | H04L 67/306 |
| 2021/0336966 | A1* | 10/2021 | Gujarathi | H04L 9/3247 |
| 2022/0006803 | A1* | 1/2022 | Shi | H04L 63/0815 |
| 2022/0050643 | A1* | 2/2022 | Horigane | G06F 3/1256 |
| 2022/0342976 | A1* | 10/2022 | Stoyanov | H04L 63/0807 |

OTHER PUBLICATIONS

S. Choudhury, "A Primer on ACID Transactions: The Basics Every Cloud App Developer Must Know," https://blog.yugabyte.com/a-primer-on-acid-transactions/, Jul. 19, 2018, 5 pages.

Yugabytedb, "Design Goals," https://docs.yugabyte.com/latest/architecture/design-goals/, Accessed Sep. 28, 2021, 4 pages.

A. Brasetvik, "Elasticsearch as a NoSQL Database," https://www.elastic.co/blog/found-elasticsearch-as-nosql, Sep. 15, 2013, 4 pages.

MongoDB, "Introduction to MongoDB," https://docs.mongodb.com/manual/introduction/#key-features/, Accessed Sep. 28, 2021, 1 page.

Oracle, "Database Concepts: Introduction to the Oracle Database," https://docs.oracle.com/cd/E11882_01/server.112/e40540/intro.htm#CNCPT001, Accessed Sep. 28, 2021, 32 pages.

S. Gulati, "MemSQL Introduction: A Hybrid Transactional/Analytical Processing Database," https://shekhargulati.com/tag/memsql/, Sep. 15, 2019, 6 pages.

Apache Software, "Cassandra Documentation," https://cassandra.apache.org/doc/latest/cassandra/architecture/overview.html, Accessed Sep. 28, 2021, 4 pages.

* cited by examiner

CONNECTION 1: NEW CONNECTION WITH USERNAME/PASSWORD AND DATABASE (ALIAS*DB1)

CONNECTION 2: SAME USERNAME/PASSWORD AS CONNECTION 1 BUT WITH DIFFERENT DATABASE (ALIAS*DB2)

CONNECTION 3: DIFFERENT USERNAME/PASSWORD THAN CONNECTION 1, BUT TO THE SAME DATABASE AS CONNECTION 1 (ALIAS*DB1)

...

NTH CONNECTION: SAME USERNAME/PASSWORD AS CONNECTION 1, BUT AFTER TIMEOUT AND TO DIFFERENT DATABASE (ALIAS*DB3)

N+1TH CONNECTION: SAME USERNAME/PASSWORD AS NTH CONNECTION, TO THE SAME OR A DIFFERENT DATABASE (ALIAS*DB3/DB4)

FIG. 4E

SINGLE SIGN-ON SERVICES FOR DATABASE CLUSTERS

FIELD

The field relates generally to information processing, and more particularly to techniques for managing information processing systems.

BACKGROUND

Managing information technology (IT) infrastructure can be challenging, particularly as IT infrastructure and associated environments continue to grow in complexity. For example, an IT infrastructure may include a large number of applications, each of which is configured to access or otherwise utilize multiple different database systems. The task of establishing connections between different ones of the applications and different ones of the database systems is challenging, as typically each database system is accessed with a different set of credentials.

SUMMARY

Illustrative embodiments of the present invention provide techniques for enabling single sign-on services for database clusters.

In one embodiment, an apparatus comprises at least one processing device comprising a processor coupled to a memory. The at least one processing device is configured to perform the step of receiving, from a given client at a single sign-on manager coupled to a database cluster comprising a plurality of databases, an access request comprising an identifier of a given one of the plurality of databases in the database cluster and single sign-on credentials for the given client to access the database cluster. The at least one processing device is also configured to perform the steps of authenticating, at the single sign-on manager, the single sign-on credentials in the access request and, responsive to authenticating the single sign-on credentials in the access request, establishing a connection between the given client and the given one of the plurality of databases in the database cluster utilizing a session established between the single sign-on manager and the given one of the plurality of databases in the database cluster.

These and other illustrative embodiments include, without limitation, methods, apparatus, networks, systems and processor-readable storage media.

BRIEF DESCRIPTION OF THE DRAWINGS

FIGS. 4A-E show an architecture and process flow for enabling single sign-on for database clusters in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
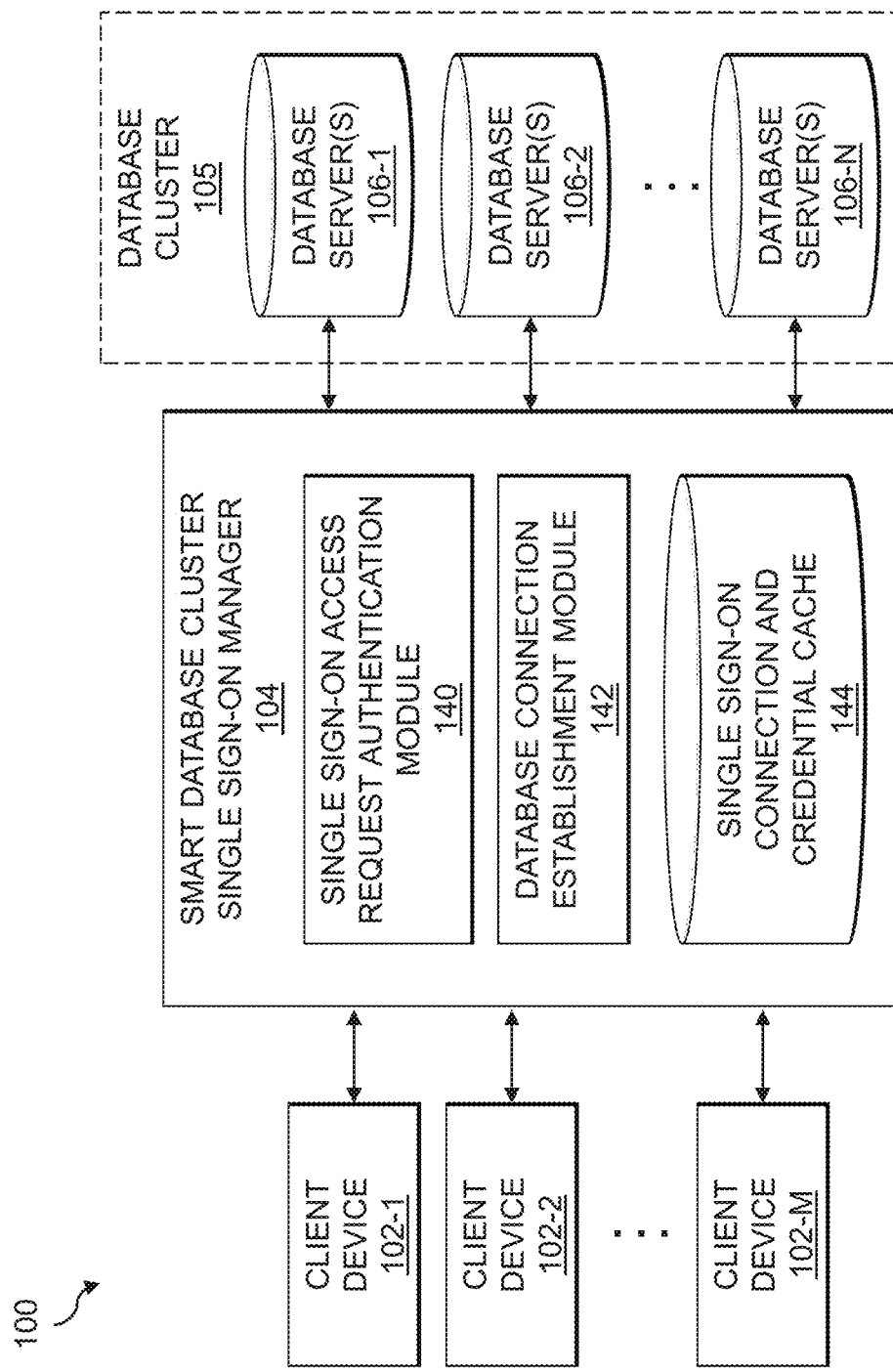
FIG. 1 is a block diagram of an information processing system configured for enabling single sign-on services for database clusters in an illustrative embodiment of the invention.

FIG. 1 shows an information processing system 100 configured in accordance with an illustrative embodiment. The information processing system 100 is assumed to be built on at least one processing platform and provides functionality for enabling single sign-on services for database clusters. The information processing system 100 includes a set of client devices 102-1, 102-2, . . . 102-M (collectively, client devices 102) that are coupled to a smart database cluster single sign-on (SSO) manager 104. The smart database cluster SSO manager 104 is configured to provide SSO services for a database cluster 105 comprising a plurality of databases running on a set of database servers 106-1, 106-2, . . . 106-N (collectively, database servers 106) also coupled to the smart database cluster SSO manager 104.

Although not explicitly shown in FIG. 1, the client devices 102, the smart database cluster SSO manager 104 and the database servers 106 are assumed to be coupled via one or more networks. Such networks may comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The client devices 102 may comprise respective compute resources, which may include physical and virtual computing resources of an information technology (IT) infrastructure. Physical computing resources may include physical hardware such as servers, storage systems, networking equipment, Internet of Things (IoT) devices, other types of processing and computing devices, etc. Virtual computing resources may include virtual machines (VMs), software containers, etc.

In some embodiments, client devices 102 are assumed to comprise physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, software containers, etc.

The client devices 102 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

Each of the client devices 102 may be associated with one or more users and/or applications which access databases provided by the database servers 106 of the database cluster 105. The smart database cluster SSO manager 104, as discussed in further detail below, enables SSO services which facilitate the establishment of connections between such users and/or applications of the client devices 102 and the databases provided by the database servers 106. It should be noted that the term "user" herein is intended to be broadly construed so as to encompass numerous arrangements of human, hardware, software or firmware entities, as well as combinations of such entities.

Although not explicitly shown in FIG. 1, one or more input-output devices such as keyboards, displays or other types of input-output devices may be used to support one or more user interfaces to the client devices 102, the smart database cluster SSO manager 104, and/or the database servers 106, as well as to support communication between the client devices 102, the smart database cluster SSO manager 104, the database servers 106 and other related systems and devices not explicitly shown.

In some embodiments, information is exchanged between the smart database cluster SSO manager 104 and the client devices 102 using one or more host agents. Similarly, information exchanged between the smart database cluster SSO manager 104 and the database servers 106 using one or more host agents. The host agents on the client devices 102 are also referred to as client-side agents, while the host agents on the database servers 106 are also referred to as server-side or database-side agents. The client-side and server-side agents may be implemented as respective interfaces (e.g., web-based interfaces, representational state transfer (REST) or other types of application programming interfaces (APIs), database drivers, etc.) that enable exchange of information among the client devices 102, the smart database cluster SSO manager 104, and the database servers 106. By way of example, the client-side agents may be used by the client devices 102 for exchanging information with the smart database cluster SSO manager 104 as part of a two-way authentication process for users of the client devices 102 or for applications running on the client devices 102. As another example, the server-side or database-side agents may be used by the database servers 106 for validating requests from the smart database cluster SSO manager 104 to generate database sessions, where such database sessions may be utilized by the smart database cluster SSO manager 104 for establishing direct connections between authenticated ones of the client devices 102 and the databases provided by the database servers 106.

It should be noted that a "host agent" as this term is generally used herein may comprise an automated entity, such as a software entity running on a processing device. Accordingly, a host agent need not be a human entity.

The client devices 102, the smart database cluster SSO manager 104, and the database servers 106 in the FIG. 1 embodiment are assumed to be implemented using at least one processing device. Each such processing device generally comprises at least one processor and an associated memory, and implements one or more functional modules for controlling certain features of the client devices 102, the smart database cluster SSO manager 104 and the database servers 106.

In the FIG. 1 embodiment, the smart database cluster SSO manager 104 comprises an SSO access request authentication module 140, a database connection establishment module 142, and a SSO connection and credential cache 144.

The smart database cluster SSO manager 104 is configured to receive access requests from the client devices 102 (e.g., from users thereof, from applications running thereon, etc.) that are directed to databases hosted by the database servers 106 of the database cluster 105. The databases of the database cluster 105 are assumed to comprise heterogeneous database types providing different sets of features. Each of the access requests is assumed to comprise an identifier of a given one of a plurality of databases in the database cluster 105, as well as SSO credentials for a given client. The SSO access request authentication module 140 is configured to authenticate the SSO credentials in the access requests. To do so, the SSO access request authentication module 140 can access the SSO connection and credential cache 144 (e.g., which is assumed to store various information, such as information relating to active sessions between the smart database cluster SSO manager 104 and the databases of the database cluster 105, credentials for active previously authenticated connections between the client devices 102 and the smart database cluster SSO manager 104, etc.), and determine whether the given client has an active authenticated connection managed by the smart database cluster SSO manager 104 for at least one of the databases in the database cluster 105 (where said at least one database may be the same database identified in the access request, or a different database). If there is no active connection for the given client, the SSO access request authentication module 140 is configured to perform a challenge-response protocol with the given client. If there is an active connection for the given client, the SSO access request authentication module 140 may bypass the challenge-response protocol.

The database connection establishment module 142 is configured, responsive to authenticating the SSO credentials in an access request, to establish a connection between a given client submitting that access request and a given one of the databases in the database cluster 105 that is identified in the access request. To do so, the database connection establishment module 142 utilizes a session that is established between the smart database cluster SSO manager 104 and the given database in the database cluster 105. The database connection establishment module 142 is configured to consult the SSO connection and credential cache 144, to determine whether there is an existing validated session between the smart database cluster SSO manager 104 and the given database in the database cluster 105. If there is an existing validated session, then the database connection establishment module 142 utilizes that existing validated session to establish a direct connection between the given client and the given database. If there is no existing validated session, then the database connection establishment module 142 creates a new validated session between the smart database cluster SSO manager 104 and the given database, and then establishes the direct connection between the given client and the given database using the newly validated session.

At least portions of the SSO access request authentication module 140 and the database connection establishment module 142 and other components of the information processing system 100 may be implemented at least in part in the form of software that is stored in memory and executed by processors of such processing devices.

The SSO connection and credential cache 144 may be implemented using one or more storage systems or devices associated with the smart database cluster SSO manager 104, or potentially one or more storage systems or devices associated with one or more of the client devices 102 and/or the database servers 106. In some embodiments, one or more of such storage systems may comprise a scale-out all-flash content addressable storage array or other type of storage array. The term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

It is to be appreciated that the particular arrangement of the client devices 102, the smart database cluster SSO manager 104, and the database servers 106 illustrated in the FIG. 1 embodiment is presented by way of example only, and alternative arrangements can be used in other embodiments. For example, one or more of the database servers 106 may be implemented at least in part internal to the smart database cluster SSO manager 104. As another example, the functionality associated with the SSO access request authentication module 140 and the database connection establishment module 142 may be combined into one module, or separated across more than two modules with the multiple modules possibly being implemented with multiple distinct processors or processing devices.

It is to be understood that the particular set of elements shown in FIG. 1 for enabling SSO services for database clusters is presented by way of illustrative example only, and in other embodiments additional or alternative elements may be used. Thus, another embodiment may include additional or alternative systems, devices and other network entities, as well as different arrangements of modules and other components.

One or more of the client devices 102, the smart database cluster SSO manager 104 and/or the database servers 106, in some embodiments, may be part of cloud infrastructure as will be described in further detail below.

The client devices 102, the smart database cluster SSO manager 104, the database servers 106 and other components of the information processing system 100 in the FIG. 1 embodiment, are assumed to be implemented using at least one processing platform comprising one or more processing devices each having a processor coupled to a memory. Such processing devices can illustratively include particular arrangements of compute, storage and network resources.

The client devices 102, the smart database cluster SSO manager 104, the database servers 106, or components thereof, may be implemented on respective distinct processing platforms, although numerous other arrangements are possible. For example, in some embodiments at least portions of the client devices 102, the smart database cluster SSO manager 104 and the database servers 106 are implemented on the same processing platform. A given client device (e.g., 102-1) can therefore be implemented at least in part within at least one processing platform that implements at least a portion of at least a given one of the database servers 106 and/or the smart database cluster SSO manager 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the smart database cluster SSO manager 104, and the database servers 106, or portions or components thereof, to reside in different data centers. Numerous other distributed implementations are possible. The client devices 102, the smart database cluster SSO manager 104 and the database servers 106 can also be implemented in a distributed manner across multiple data centers.

Additional examples of processing platforms utilized to implement portions of the information processing system 100 of FIG. 1 in illustrative embodiments will be described in more detail below in conjunction with FIGS. 5 and 6.

It is to be appreciated that these and other features of illustrative embodiments are presented by way of example only, and should not be construed as limiting in any way.

Figure 2:
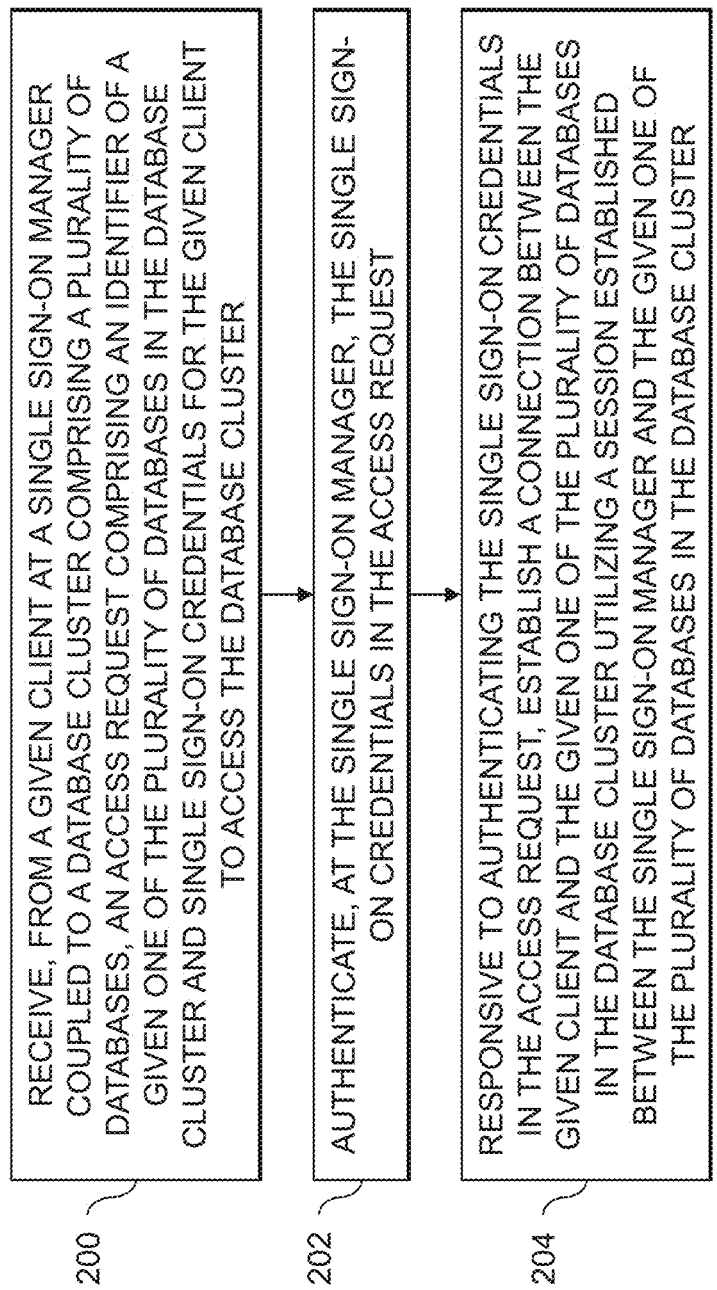
FIG. 2 is a flow diagram of an exemplary process for enabling single sign-on services for database clusters in an illustrative embodiment.

An exemplary process for enabling SSO services for database clusters will now be described in more detail with reference to the flow diagram of FIG. 2. It is to be understood that this particular process is only an example, and that additional or alternative processes for enabling SSO services for database clusters can be carried out in other embodiments.

In this embodiment, the process includes steps 200 through 204. These steps are assumed to be performed at least in part by the smart database cluster SSO manager 104 utilizing the SSO access request authentication module 140 and the database connection establishment module 142. The process begins with step 200, receiving, from a given client (e.g., one of the client devices 102) at the smart database cluster SSO manager 104 coupled to a database cluster comprising a plurality of databases (e.g., database servers 106), an access request comprising an identifier of a given one of the plurality of databases in the database cluster and SSO credentials for the given client to access the database cluster. In step 202, the smart database cluster SSO manager 104 authenticates the SSO credentials in the access request. Responsive to authenticating the SSO credentials in the access request, the smart database cluster SSO manager 104 in step 204 establishes a connection between the given client and the given one of the plurality of databases in the database cluster utilizing a session established between the smart database cluster SSO manager 104 and the given one of the plurality of databases in the database cluster.

The plurality of databases in the database cluster may comprise two or more different types of databases, such as heterogenous database types providing different sets of features. The different sets of features may be associated with at least one of: atomicity, consistency, isolation and durability (ACID) properties of database transactions; and write and read speeds for different types of database transactions.

The SSO credentials may comprise credentials for a universal service account associated with the smart database cluster SSO manager 104, which are utilized by the given client for accessing each of the plurality of databases in the database cluster. Alternatively or additionally, the given client may be associated with an enterprise system (e.g., a business, organization or other type of entity), with the SSO credentials comprising a username and password utilized by the given client for authentication within the enterprise system.

In some embodiments, step 202 includes determining, utilizing a repository of cached information for active connections managed by the smart database cluster SSO manager 104, whether the given client has an active authenticated connection managed by the the smart database cluster SSO manager 104 for at least one of the databases in the database cluster. Responsive to determining that the given client does not have an active connection managed by the smart database cluster SSO manager 104 for at least one of the databases in the cluster of databases, step 202 may comprise performing a challenge-response protocol between the given client and the smart database cluster SSO manager 104 to authenticate the given client. Responsive to determining that the given client has an active connection managed by the smart database cluster SSO manager 104 for at least one of the databases in the cluster of databases, step 202 may comprise bypassing the challenge-response protocol between the given client and the smart database cluster SSO manager 104.

In some embodiments, step 204 includes determining whether there is an existing validated session between the smart database cluster SSO manager 104 and the given one of the plurality of databases in the database cluster. The existing validated session may comprise a session generated for the given one of the plurality of database in the database cluster in response to a previous access request by the given client, or a session generated for the given one of the plurality of databases in the database cluster in response to a previous access request by another client different than the given client. Responsive to determining that there is an existing validated session between the smart database cluster SSO manager 104 and the given one of the plurality of databases in the database cluster, step 204 may comprise establishing the connection between the client and the given one of the plurality of databases in the database cluster utilizing the existing validated session. Responsive to determining that there is no existing validated session between the smart database cluster SSO manager 104 and the given one of the plurality of databases in the database cluster, step 204 may comprise creating a new validated session between the smart database cluster SSO manager 104 and the given one of the plurality of databases in the database cluster and establishing the connection between the given client and the given one of the plurality of databases in the database cluster utilizing the new validated session.

In the modern database world, the amount of heterogenous database types are growing continually. Traditionally, an application would use a single database for all of its data purposes. Different types of database systems are being continually developed, and such different types of database systems may each have a unique set of features. For example, a first type of database system (e.g., Oracle®) may be suitable for ACID (atomicity, consistency, isolation, durability) compliant transactions, a second type of database system (e.g., MongoDB®) may be more suitable for document type data storage and fast reads of the same, a third type of database system (e.g., Cassandra®) may be more suitable for distributed writes with eventual consistency reads, a fourth type of database system (e.g., YugaByte®) may be more suitable for consistent writes and reads, a fifth type of database system (e.g., memSQL®) may be more suitable for in-memory reads, etc. Today, a single application may use multiple different types of database systems according to their use cases to leverage such different features and functionality. For example, a single application can have or utilize more than four database systems in order to increase its performance and reliability.

As the number of database systems utilized by applications increases, the challenge of maintaining the database systems in an IT infrastructure becomes more and more challenging. With a distributed and ever-expanding IT infrastructure (e.g., across servers, data centers, cloud platforms, etc.), database administrators (DBAs) may struggle to manage separate user stores for accessing each database, Software-as-a-Service (SaaS) application, or other resource. Further, individual applications need to store connection strings for individual databases in some configuration file. Connection strings are an example of what is more generally referred to herein as credentials. Connections strings or other types of credentials are used for accessing different databases. While approaches such as Lightweight Directory Access Protocol (LDAP) may be used for maintaining usernames and passwords, such approaches do not eliminate the need for maintaining connection strings or other types of credentials to be used for different databases.

As discussed above, in some cases a single application uses multiple databases according to its use cases. While the use of multiple databases (e.g., with potentially different features) can increase the performance and reliability of the application, it increases the complexity of maintaining different connection strings or other types of credentials for the different databases. Further, a DBA which manages multiple applications may need to maintain multiple different connection strings or other types of credentials for each application. As the number of applications being managed increases, the task of maintaining the connection strings or other types of credentials becomes more and more difficult. Consider, as an example, an organization, enterprise or other entity (e.g., in the corporate industry) that manufactures or sells various devices, products or other services. DBAs of that organization may maintain different application modules (e.g., sets of logical application groups) for delivering an experience in the organization. An application module may include, for example, applications for offline sales, online sales, quotes, pipe line, order management, etc. One or multiple DBAs may manage one or more application modules. Each application module, and potentially each application within the application module, may contain or utilize multiple databases. There is a need for maintaining user information and connection strings or other types of credentials for such multiple database instances.

Figure 3:
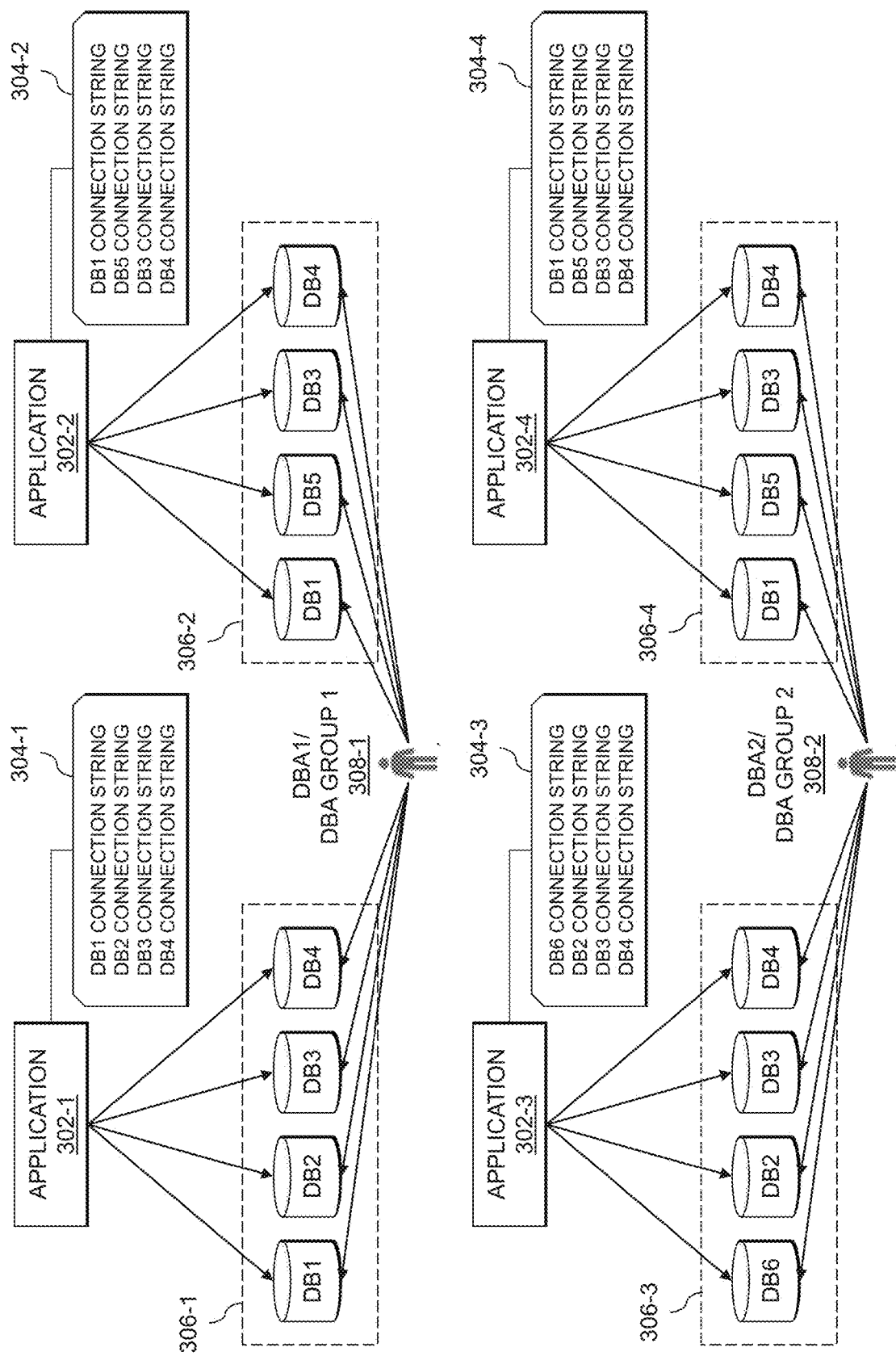
FIG. 3 shows applications managed by one or more database administrators that are configured to access different clusters of databases using multiple connection strings in an illustrative embodiment.

FIG. 3 shows an example of application modules, including applications 302-1, 302-2, 302-3 and 302-4 (collectively, applications 302) that are managed by DBAs 308-1 and 308-2 (collectively, DBAs 308). More particularly, DBA 308-1 manages applications 302-1 and 302-2 and DBA 308-2 manages applications 302-3 and 302-4. Each of the applications 302 is associated with a respective set of connection strings 304-1, 304-2, 304-3 and 304-4 (collectively, connection strings 304) storing connection string information for an associated set of databases 306-1, 306-2, 306-3 and 306-4 (collectively, databases 306) utilized by the applications 302. The connection strings 304 are examples of what is more generally referred to herein as credentials. In the FIG. 3 example, it is assumed that each of the applications 302 utilizes four different databases—application 302-1 utilizes a set of databases 306-1 including DB1, DB2, DB3 and DB4; application 302-2 utilizes a set of databases 306-2 including DB1, DB5, DB3 and DB4; application 302-3 utilizes a set of databases 306-3 including DB6, DB2, DB3 and DB4; and application 302-4 utilizes a set of databases 306-4 including DB1, DB5, DB3 and DB4. While in the FIG. 3 example each of the applications 302 utilizes four different databases, this is not a requirement. Each of the applications 302 may use more or fewer than four databases, and different ones of the applications 302 may use different numbers of applications (e.g., one application may use a first number of databases, while another may use a second number of databases different than the first number of databases). The databases DB1, DB2, DB3, DB4, DB5 and DB6 may be different types of databases (e.g., Oracle, Mongo, Cassandra, Elastic, memSQL, MS SQL, etc.) providing different features.

Illustrative embodiments provide solutions that enable smart clustered SSO for databases. A database group that a DBA or group of DBAs is managing (e.g., one or more application modules each including one or more applications utilizing one or more databases) is handled as a single "smart" cluster. Using the techniques described herein, the DBA or group of DBAs do not need to worry about handling multiple different connection strings or other types of credentials for each user, client or application that accesses the multiple databases in the cluster. Instead, the DBA or group of DBAs may need to manage only a single connection string or other type of credential to access the multiple databases. Once a user, client or application is successfully logged into one database in the cluster, if the session is valid, other databases can be accessed by the same user, client or application without entering the credential again. For example, assume a user, client or application has successfully logged in to a first database (e.g., an Oracle database) and that this database session is valid. If so, that user, client or application can log in to a second database (e.g., a MongoDB) without re-entering the whole credential. Further, clients, users and applications need to worry about only one database connection string or other type of credential for all heterogeneous databases in the smart database cluster. Also, once the SSO manager successfully authenticates and validates to a particular database in the database cluster to create a session, so long as that session remains valid connections may be directly established between clients and that database (e.g., without requiring repeated authentication and validation).

With a heterogeneous, distributed and ever-expanding infrastructure across servers and datacenters in modern IT infrastructure, DBAs struggle to manage separate user stores for access to each database. With such heterogeneous, distributed and ever-expanding infrastructure, each application needs to maintain different database connection strings or other types of credentials for accessing different databases. Any changes in the credentials lead to changes in all users, clients or applications in the IT infrastructure.

LDAP authentication may be used for some types of database access. LDAP authentication, however, does not help to reduce the number of credentials that users, clients, applications or DBAs need to maintain, as the credential uniform resource identifier (URI) for each database may be different. Illustrative embodiments use a smart SSO manager for databases, which advantageously abstracts the complexities of connection strings or other types of credentials for different databases and maintains user secrets, different database connection user interfaces (UIs), user sessions, and connection pooling.

When the smart SSO manager receives a request from a user, client or application to connect to a database that is part of a smart database cluster managed by the smart SSO manager, a determination is made as to whether the session and client identity matches (e.g., where the client identity may be a corporate NT username and password, a universal service account and password for the smart database cluster) and a database identity (e.g., ORA for Oracle, MOB for MongoDB, CAS for Cassandra, etc.) also matches one of the databases in the smart database cluster managed by the smart SSO manager. If such information matches, the smart SSO manager will give back a connection from a pool, or a newly-created connection. Once the connection is established, the user, client or application will start transacting directly to the database using the established connection.

Figure 4A:
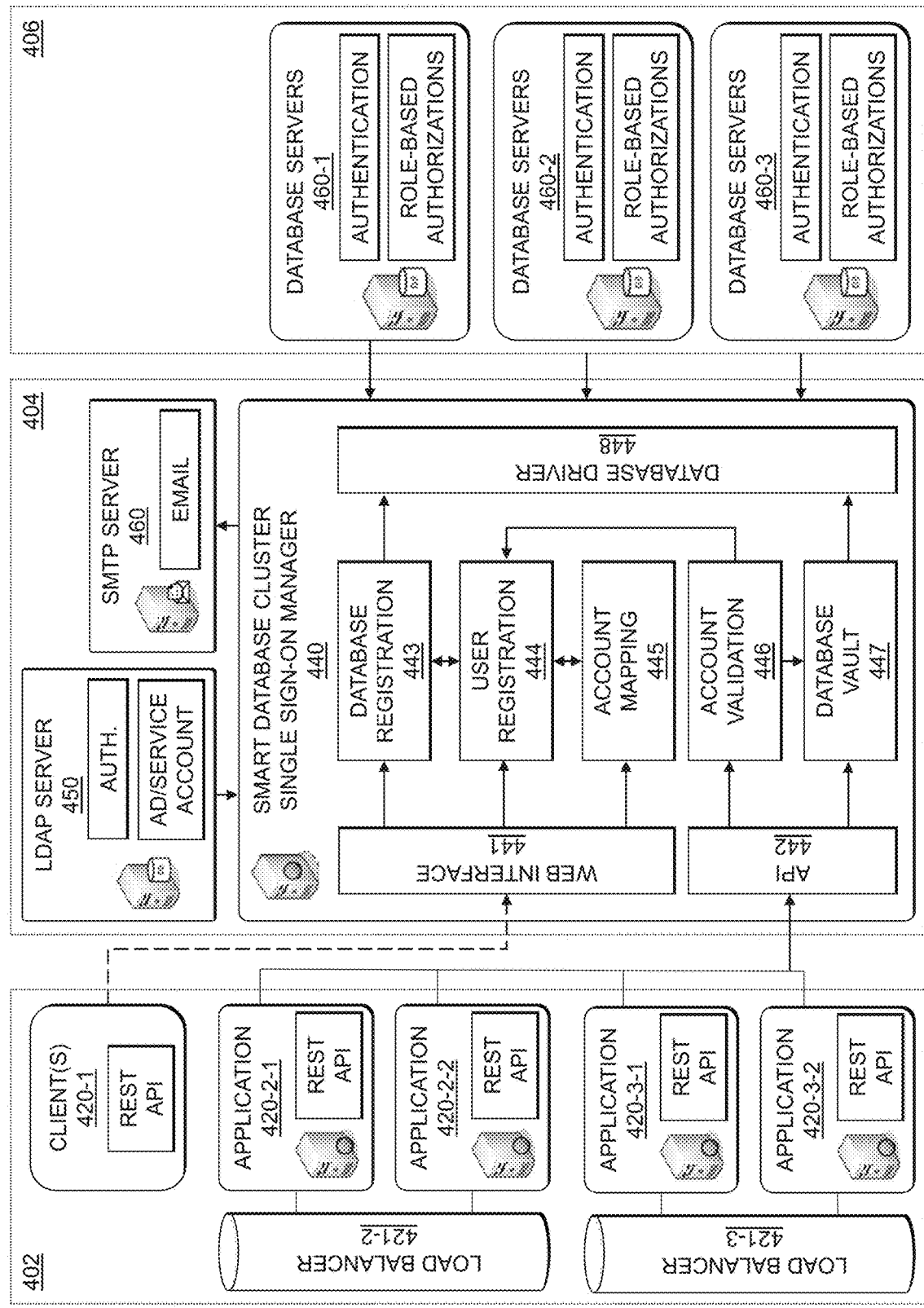

FIGS. 4A-4E illustrate an architecture and operation of an SSO manager for smart database clusters. As shown in FIG. 4A, a set of clients and applications 402 utilize management entity 404 to access a set of databases 406. The set of clients and applications 402 includes one or more clients 420-1 that access a smart database cluster SSO manager 440 via a web interface 441. To do so, the clients 420-1 may utilize a representational state transfer (REST) application programming interface (API), which may also be referred to as a database (DB) SSO API. Application instances 420-2-1 and 420-2-2 (collectively, application 420-2) are accessed via load balancer 421-2 (e.g., which distributes access requests among the different application instances 420-2-1 and 420-2-2 of the application 420-2). Application instances 420-3-1 and 420-3-2 (collectively, application 420-3) are accessed via load balancer 421-3 (e.g., which distributes access requests among the different application instances 420-3-1 and 420-3-2 of the application 420-3). The application 420-2 may be, by way of example, an online sales application while the application 420-3 may be an offline sales application. Each of the application instances 420-2-1, 420-2-2, 420-3-1 and 420-3-2 may have an associated REST API (also referred to as DB SSO APIs) that accesses the smart database SSO manager 440 via an API 442 (e.g., which may also be a REST API).

The clients 420-1, application 420-2 and application 420-3 are collectively referred to as clients and applications 420. The databases 406 include database servers 460-1, 460-2 and 460-3 (collectively, database servers 460). The database servers 460-1, 460-2 and 460-3 are assumed to be associated with different types of databases (e.g., providing different functionality, such as Oracle databases, MongoDB databases, Cassandra databases, Elastic databases, memSQL databases, MS SQL databases, etc.). Each of the database servers 460 is assumed to provide authentication and role-based authorization services.

The access management entity 404 includes the smart database cluster SSO manager 440, as well as an LDAP server 450 and a Simple Mail Transfer Protocol (SMTP) server 460. The LDAP server 450 illustratively provides authorization and active directory (AD)/service account services, and the SMTP server 460 illustratively provides email services for the smart database cluster SSO manager 440. The smart database cluster SSO manager 440 includes the web interface 441 accessed by the clients 420-1, as well as the API 442 accessed by the applications 420-2 and 420-3. The smart database cluster SSO manager 440 further includes a database registration component 443, a user registration component 444, an account mapping component 445, an account validation component 446, a database vault component 447 and a database driver or API 448 for accessing the database servers 460.

The clients 420-1 access the web interface 441, and use the database registration component 443 to configure databases 406 for use with the smart database cluster SSO manager 440. The database registration component 443 tests such configuration parameters utilizing the database driver 448. The clients 420-1 also utilize the web interface 441 to access the user registration component 444 to register individual users (e.g., which may be ones of the clients and applications 420) that are enabled to access the databases 406. The clients 420-1 further utilize the web interface 441 to access the account mapping component 445, which may be utilized to map registered users with registered databases.

The applications 420-2 and 420-3 access the account validation component 446 and DB vault component 447 of the smart database cluster SSO manager 440 via the API 442. The account validation component 446 is used for validating access by the applications 420-2 and 420-3 to different ones of the databases 406. The DB vault component 447 is used to manage sessions established by the applications 420-2 and 420-3 and associated connections to the database server 460 via the DB driver 448.

Figure 4B:
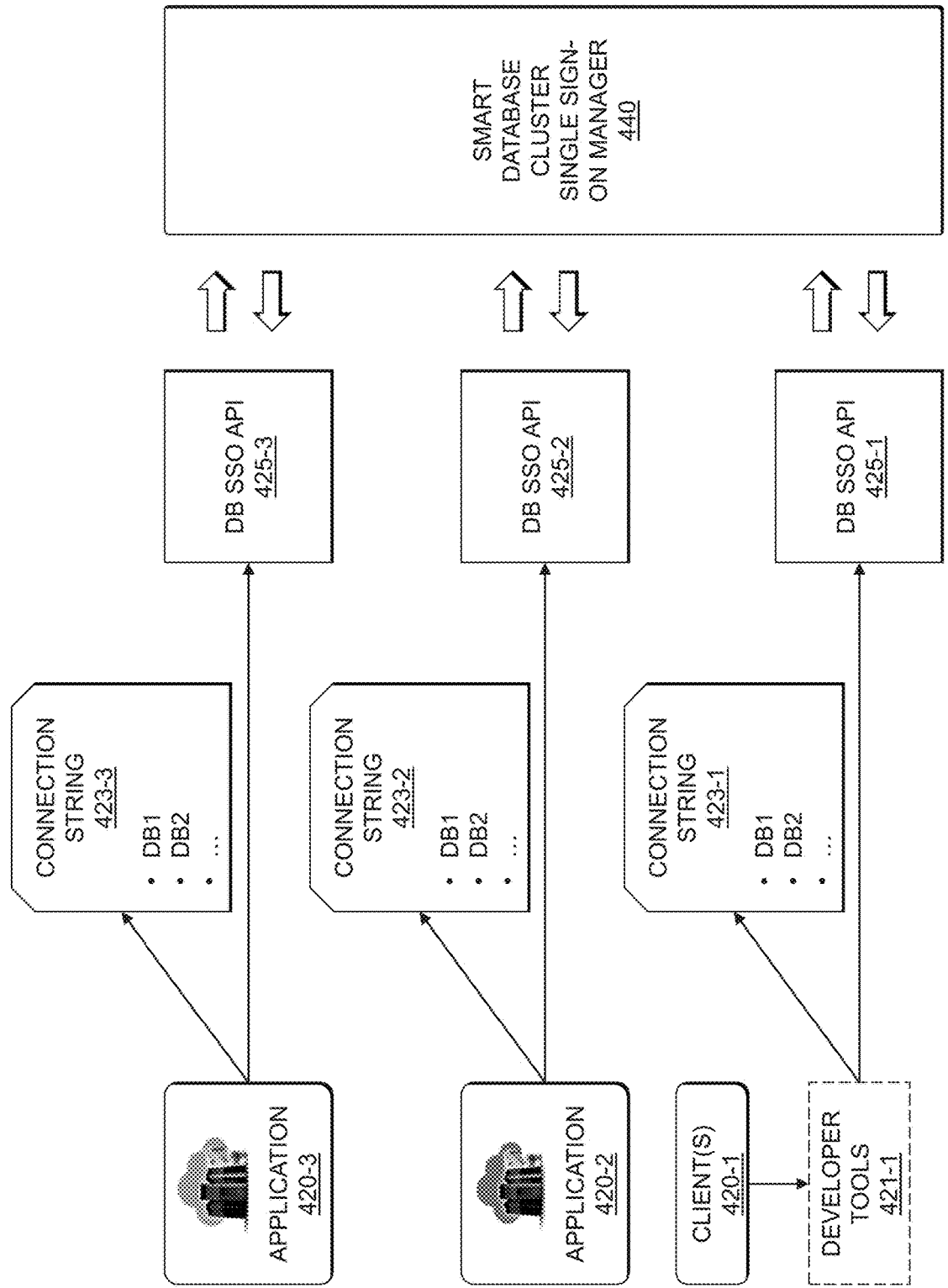
Figure 4C:
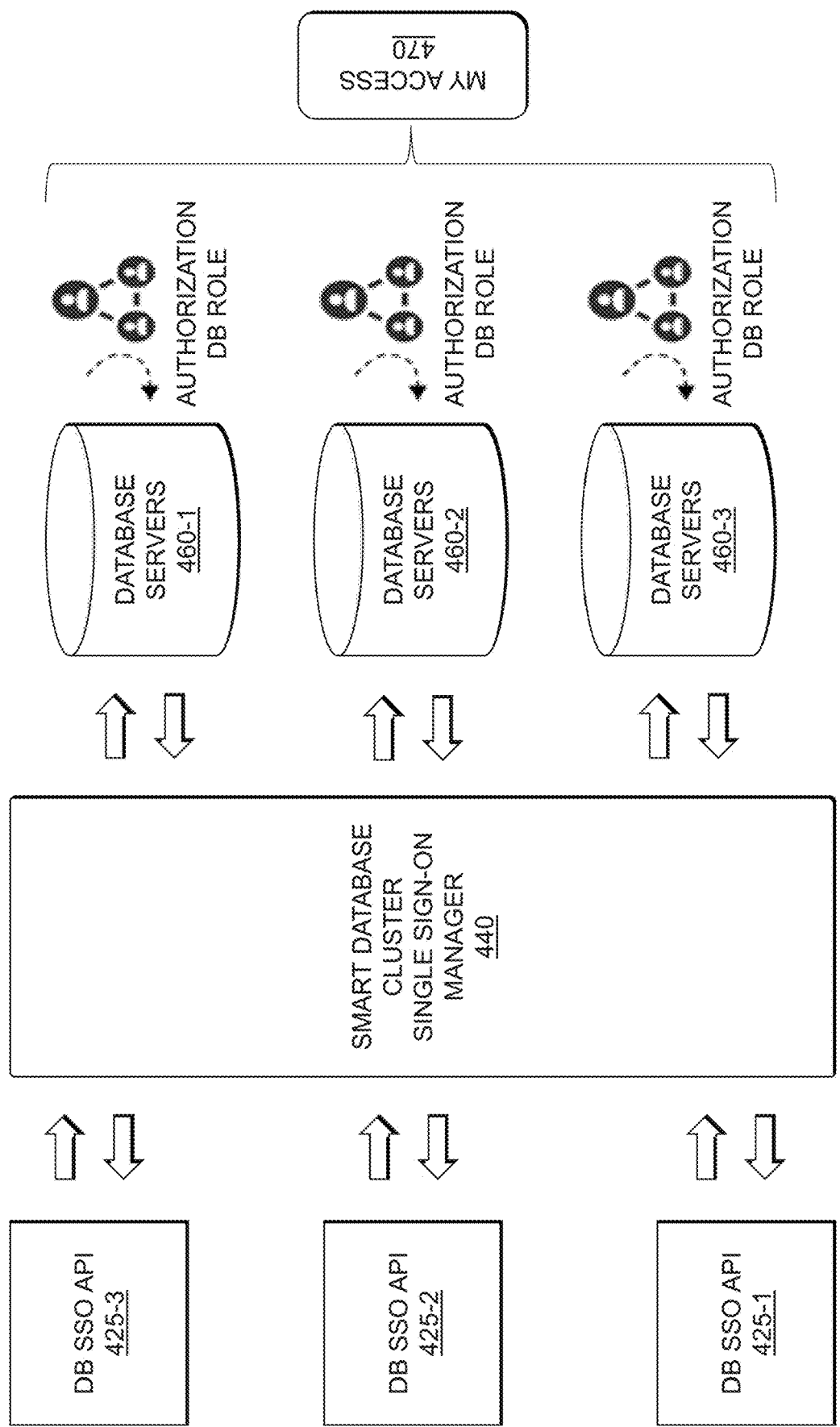

FIG. 4B shows the clients 420-1 and applications 420-2 and 420-3 accessing the smart database cluster SSO manager 440 utilizing their respective REST APIs, shown as respective DB SSO APIs 425-1, 425-3 and 425-3 (collectively, DB SSO APIs 425). The clients 420-1, application 420-2 and application 420-3 are associated with respective connection strings 423-1, 423-2 and 423-3 (collectively, connection strings 423). The connections strings 423 may alternatively be referred to as aliases, and are examples of what is more generally referred to herein as credentials used to access the databases 406. In FIG. 4B, the clients 420-1 are shown as accessing the DB SSO API 425-1 via developer tools 421-1 (e.g., Structured Query Language (SQL) and/or non-SQL (NoSQL) developer tools). FIG. 4C shows the database servers 460 performing authorization for DB roles to provide access via a MyAccess component 470.

Figure 4D:
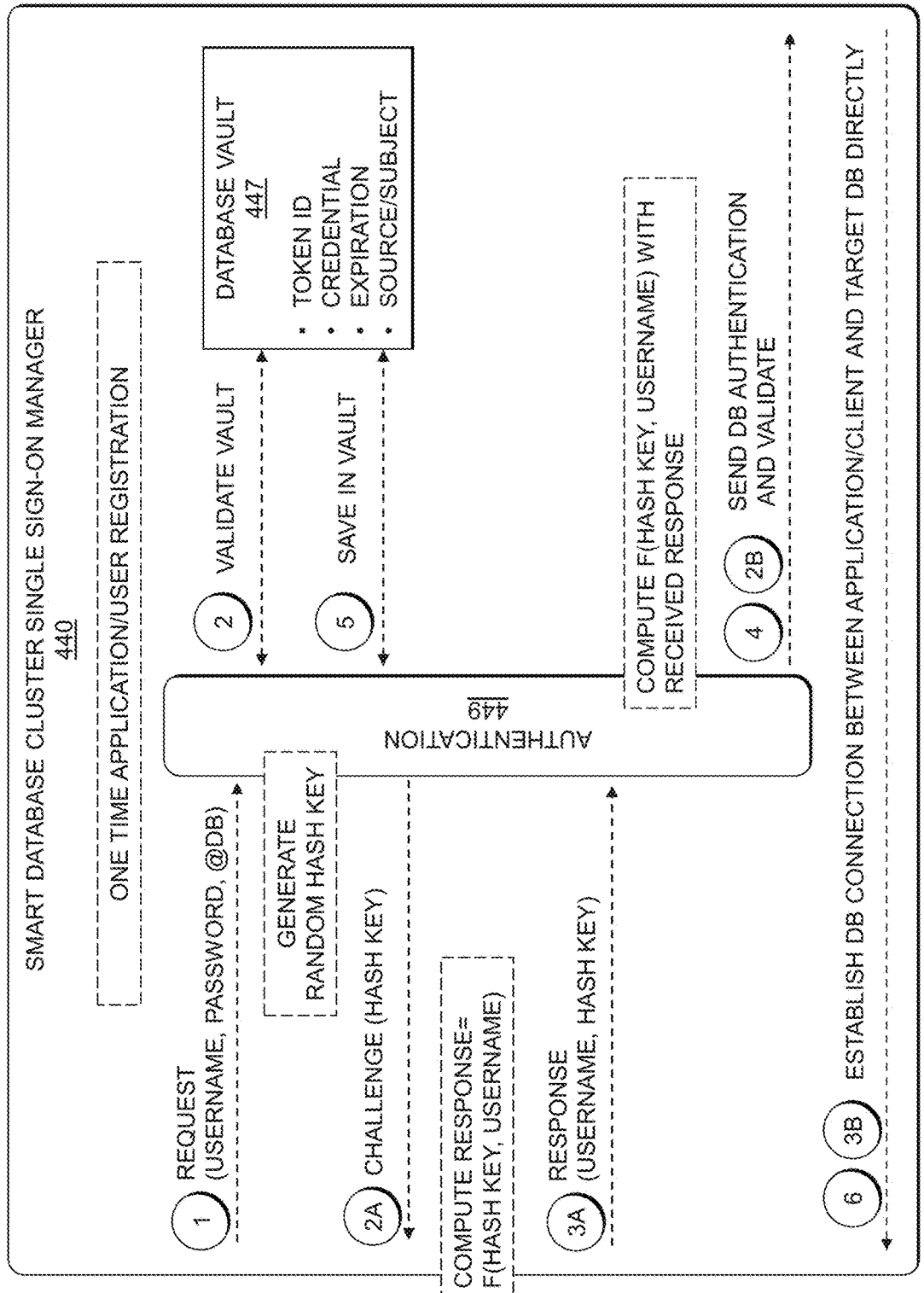

FIG. 4D illustrates steps used for establishing connections between the clients and applications 420 and the database servers 460:

Step 1 includes a requesting entity sending an access request to an authentication component 449, where the access request is assumed to comprise credentials such as a username, password and a database alias (denoted @DB);

Step 2 includes validating the credentials using the database vault component 447, where the database vault component 447 may include token identifiers (IDs), credentials, expiration information, source/subject mappings, etc.;

Step 2A includes providing a challenge back to the requesting entity, where the challenge includes a random hash key;

Steps 2B and 4 include sending a DB authentication request to a database identified by the database alia in the access request, and validation of that request;

Step 3A includes the requesting entity providing a response to the challenge from Step 2A to the authentication component, where the response is computed by the requesting entity as a function of the hash key and username;

Steps 3B and 6 include establishing a DB connection between the requesting entity (e.g., an application or client) and a target DB (e.g., identified by the database alias in the Step 1 access request) directly; and Step 5 includes saving the random hash generated for the Step 2A challenge in the database vault component 447.

FIG. 4E illustrates the sequences of such steps used for different connections 1, 2, 3, . . . , N, N+1 managed by the smart database cluster SSO manager 440. Connection 1 is a "new" connection or access request with a username, password and database ID (alias DB1). Connection 1 utilizes Steps 1, 2, 2A, 3A, 4, 5 and 6. Connection 2 is a connection with the same username and password as Connection 1, but with a different database ID (alias DB2). Connection 2 utilizes steps 1, 2, 2B, and 3B. Connection 3 is a connection with a different username and password than Connection 1, but to the same database ID as Connection 1. Connection 3 utilizes steps 1, 2, 2A, 3A, 5 and 6. Connection N is a connection with the same username and password as Connection 1, but is after a timeout (e.g., expiration of a session) and to a different database ID (alias DB3). Connection N again utilizes steps 1, 2, 2A, 3A, 4, 5 and 6. Connection N+1 is a connection with the same username and password as Connection N, and is to the same or a different database ID (alias DB3 or DB4). Connection N+1 utilizes steps 1, 2, 2B and 3B.

As illustrated in FIGS. 4A-4E, there is a onetime registration for different databases 406 and their endpoints (e.g., clients and applications 420) involved in the application data model. The onetime registration may include or specify service account information with access details to the different databases 406, expiration policies, source details of interest, etc.

Consider, as an example, a human resources (HR) application (e.g., application 420-2) that is registered with the smart database cluster SSO manager 440 and proceeds through the connections 1 through N+1 described above with respect to FIG. 4E. Connection 1 is assumed to be a new connection by the HR application 420-2 to a particular database (e.g., an Oracle database). Information from the HR application 420-2 is fed through the DB SSO API 425-2 into the authentication component 429 as part of a request in Step 1. The authentication component 449 picks out the database alias information and validates it inside the DB vault component 447 in Step 2 (e.g., where the information may include source information, expiration information, username/password or other credentials verified in LDAP cache of the LDAP server 450, etc.). The authentication component 449 then generates a hash key to challenge the HR application 420-2 to pass two-way authentication in Step 2A. The authentication component 449 then receives a response in Step 3A, and the authentication component 449 validates the received response and sends a request to the DB for authentication in Step 4. Credentials are saved in the DB vault component 447 in step 5, and a connection is established to the database of interest (after an acknowledgement from that DB) and the connection is handed off in Step 6.

Connection 2 is assumed to be another connection from the HR application 420-2 with the same username and password, but with a different database alias for a different database (e.g., a MongoDB). Once the access request reaches the authentication component 449 of the smart database cluster SSO manager 440 in Step 1, the authentication component 449 compares information in the access request with the cached information in the database vault component 447 (e.g., saved in Step 5 of the Connection 1 flow) in Step 2. If the connection details are the same and valid (e.g., Connection 1 is not expired) when compared to the DB vault component 447, the authentication component 449 in Step 2B reaches the MongoDB to get authorization and then directly hands off the connection in Step 3B. It should be noted that Connection 2 will be significantly faster (e.g., 2x faster) than a normal connection. This provides significant benefits, considering that in illustrative use case scenarios there may be thousands of connections of this type (e.g., which utilize cached information in the DB vault component 447) to connect to different databases using a single account.

Connection 3 is assumed to be coming from the HR application 420-2, but utilizes a different username and password relative to Connection 1 and has the same database alias as Connection 1 (e.g., for the Oracle database). This time, the validation happens (e.g., the challenge-response of Steps 2A and 3A), but as the database is already validated (e.g., from Connection 1) then Step 4 may be skipped. The credentials are saved in the DB vault component 447 in Step 5, and the connection is established in Step 6. Here, the Connection 3 will also be significantly faster (e.g., 1.5× faster) than a normal connection.

Connection N is assumed to be coming from the HR application 420-2 but to a different database alias (e.g., for a Cassandra database) than Connection 1 and after the Connection 1 is already expired (e.g., when compared or validated with the DB vault component 447 in Step 2). In this case, Connection N proceeds through the same steps as Connection 1. It should be noted that Connection N may alternatively be for a request that is made while the Connection 1 is still valid, but where the DB vault component 447 in Step 2 indicates that the hash key generator upper limit value is reached. In such a case, the Connection N would be treated as a new connection requiring the same steps as Connection 1.

Connection N+1 is assumed to be coming from the HR application 420-2 while the Connection N is not yet expired, and may be to the same database alias (e.g., for the Cassandra database) as Connection N or a different database alias (e.g., for an Oracle database, for an Elastic database, etc.). Here, the Connection N+1 proceeds through the same steps as Connection 2. Advantageously, illustrative embodiments provide for clustered SSO for heterogeneous databases in an IT infrastructure. A single client-based authentication may be used to access multiple databases in a smart database cluster, and no additional database credential configuration is required at the application end which will eliminate Connection String Parameter Pollution (CSPP).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for enabling SSO services for database clusters will now be described in greater detail with reference to FIGS. 5 and 6. Although described in the context of system 100, these platforms may also be used to implement at least portions of other information processing systems in other embodiments.

Figure 5:
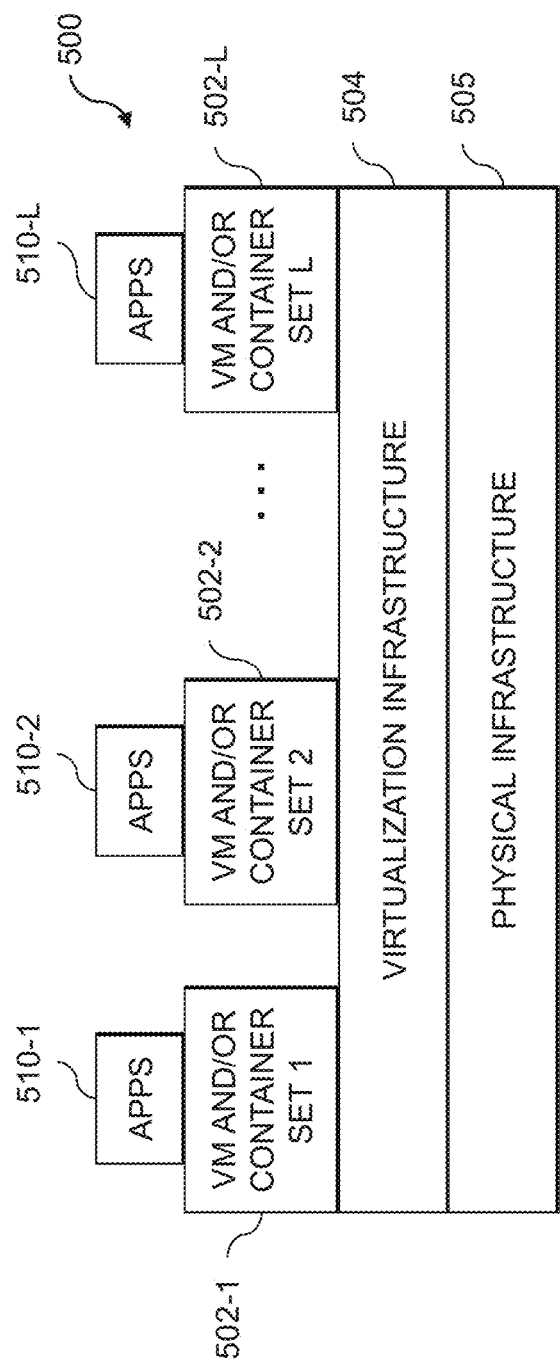
FIGS. 5 and 6 show examples of processing platforms that may be utilized to implement at least a portion of an information processing system in illustrative embodiments.
Figure 6:
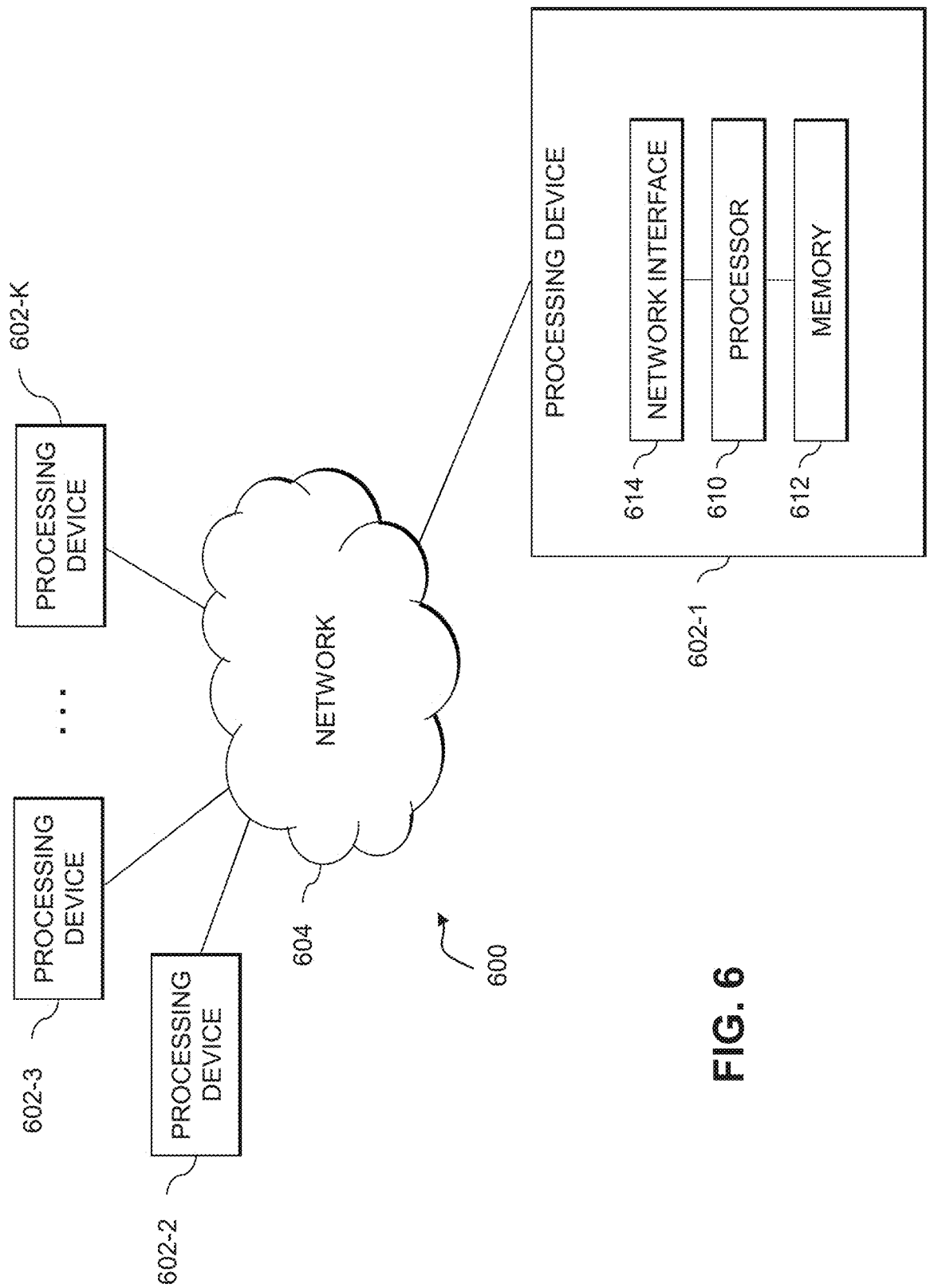

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for enabling SSO services for database clusters as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, database types, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        receiving, from a given client at a single sign-on manager coupled to a database cluster comprising a plurality of databases, an access request comprising an identifier of a given one of the plurality of databases in the database cluster and single sign-on credentials for the given client to access the database cluster;
        authenticating, at the single sign-on manager, the single sign-on credentials in the access request; and
        responsive to authenticating the single sign-on credentials in the access request, establishing a connection between the given client and the given one of the plurality of databases in the database cluster utilizing a session established between the single sign-on manager and the given one of the plurality of databases in the database cluster;
    wherein authenticating the single sign-on credentials in the access request comprises, responsive to determining that (i) the given client has an active connection managed by the single sign-on manager for at least one of the plurality of databases in the database cluster other than the given one of the plurality of databases in the database cluster and (ii) that the single sign-on credentials in the access request match single sign-on credentials utilized for the active connection managed by the single sign-on manager for said at least one of the plurality of databases in the database cluster other than the given one of the plurality of databases in the database cluster, bypassing at least a portion of a challenge-response protocol that would otherwise be carried out between the given client and the single sign-on manager.

2. The apparatus of claim 1 wherein the plurality of databases in the database cluster comprise two or more different types of databases.

3. The apparatus of claim 2 wherein the two or more different types of databases comprise heterogeneous database types providing different sets of features.

4. The apparatus of claim 3 wherein the different sets of features are associated with at least one of:
    atomicity, consistency, isolation and durability properties of database transactions; and
    write and read speeds for different types of database transactions.

5. The apparatus of claim 1 wherein the single sign-on credentials comprise credentials for a universal service account associated with the single sign-on manager utilized for accessing each of the plurality of databases in the database cluster.

6. The apparatus of claim 1 wherein the given client is associated with an enterprise system, and wherein the single sign-on credentials comprise a username and password utilized by the given client for authentication in the enterprise system.

7. The apparatus of claim 1 wherein authenticating the single sign-on credentials in the access request comprises determining, utilizing a repository of cached information for active connections managed by the single sign-on manager, whether the given client has any active connection managed by the single sign-on manager for any of the plurality of databases in the database cluster other than the given one of the plurality of databases in the database cluster.

8. The apparatus of claim 7 wherein authenticating the single sign-on credentials in the access request further comprises, responsive to determining that the given client does not have any active connection managed by the single sign-on manager for any of the plurality of databases in the database cluster other than the given one of the plurality of databases in the database cluster, performing the challenge-response protocol between the given client and the single sign-on manager to authenticate the given client.

9. The apparatus of claim 1 wherein the challenge-response protocol utilizes a hash key generator, and wherein bypassing said at least a portion of the challenge-response protocol is further responsive to determining that a number of hash keys generated utilizing the hash key generator is less than a defined threshold.

10. The apparatus of claim 1 wherein establishing the connection between the given client and the given one of the plurality of databases in the database cluster comprises determining whether there is an existing validated session between the single sign-on manager and the given one of the plurality of databases in the database cluster.

11. The apparatus of claim 10 wherein the existing validated session comprises a session generated for the given one of the plurality of databases in the database cluster in response to a previous access request by the given client.

12. The apparatus of claim 10 wherein the existing validated session comprises a session generated for the given one of the plurality of databases in the database cluster in response to a previous access request by another client different than the given client.

13. The apparatus of claim 10 wherein establishing the connection between the given client and the given one of the plurality of databases in the database cluster further comprises, responsive to determining that there is an existing validated session between the single sign-on manager and the given one of the plurality of databases in the database cluster, establishing the connection between the client and the given one of the plurality of databases in the database cluster utilizing the existing validated session.

14. An apparatus comprising:
at least one processing device comprising a processor coupled to a memory;
the at least one processing device being configured to perform steps of:
receiving, from a given client at a single sign-on manager coupled to a database cluster comprising a plurality of databases, an access request comprising an identifier of a given one of the plurality of databases in the database cluster and single sign-on credentials for the given client to access the database cluster;
authenticating, at the single sign-on manager, the single sign-on credentials in the access request; and
responsive to authenticating the single sign-on credentials in the access request, establishing a connection between the given client and the given one of the plurality of databases in the database cluster utilizing a session established between the single sign-on manager and the given one of the plurality of databases in the database cluster;
wherein establishing the connection between the given client and the given one of the plurality of databases in the database cluster comprises:
determining whether there is an existing validated session between the single sign-on manager and the given one of the plurality of databases in the database cluster; and
responsive to determining that there is no existing validated session between the single sign-on manager and the given one of the plurality of databases in the database cluster:
creating a new validated session between the single sign-on manager and the given one of the plurality of databases in the database cluster; and establishing the connection between the given client and the given one of the plurality of databases in the database cluster utilizing the new validated session.

15. A computer program product comprising a non-transitory processor-readable storage medium having stored therein program code of one or more software programs, wherein the program code when executed by at least one processing device causes the at least one processing device to perform steps of:
receiving, from a given client at a single sign-on manager coupled to a database cluster comprising a plurality of databases, an access request comprising an identifier of a given one of the plurality of databases in the database cluster and single sign-on credentials for the given client to access the database cluster;
authenticating, at the single sign-on manager, the single sign-on credentials in the access request; and
responsive to authenticating the single sign-on credentials in the access request, establishing a connection between the given client and the given one of the plurality of databases in the database cluster utilizing a session established between the single sign-on manager and the given one of the plurality of databases in the database cluster;
wherein authenticating the single sign-on credentials in the access request comprises, responsive to determining that (i) the given client has an active connection managed by the single sign-on manager for at least one of the plurality of databases in the database cluster other than the given one of the plurality of databases in the database cluster and (ii) that the single sign-on credentials in the access request match single sign-on credentials utilized for the active connection managed by the single sign-on manager for said at least one of the plurality of databases in the database cluster other than the given one of the plurality of databases in the database cluster. bypassing at least a portion of a challenge-response protocol that would otherwise be carried out between the given client and the single sign-on manager.

16. The computer program product of claim 15 wherein authenticating the single sign-on credentials in the access request comprises:
determining, utilizing a repository of cached information for active connections managed by the single sign-on manager, whether the given client has any active connection managed by the single sign-on manager for any of the plurality of databases in the database cluster other than the given one of the plurality of databases in the database cluster; and
responsive to determining that the given client does not have any active connection managed by the single sign-on manager for any of the plurality of databases in the database cluster other than the given one of the plurality of databases in the database cluster, performing the challenge-response protocol between the given client and the single sign-on manager to authenticate the given client.

17. The computer program product of claim 15 wherein establishing the connection between the given client and the given one of the plurality of databases in the database cluster comprises:
determining whether there is an existing validated session between the single sign-on manager and the given one of the plurality of databases in the database cluster;
responsive to determining that there is an existing validated session between the single sign-on manager and the given one of the plurality of databases in the database cluster, establishing the connection between the client and the given one of the plurality of databases in the database cluster utilizing the existing validated session; and responsive to determining that there is no existing validated session between the single sign-on manager and the given one of the plurality of databases in the database cluster:

creating a new validated session between the single sign-on manager and the given one of the plurality of databases in the database cluster; and establishing the connection between the given client and the given one of the plurality of databases in the database cluster utilizing the new validated session.

18. A method comprising:

receiving, from a given client at a single sign-on manager coupled to a database cluster comprising a plurality of databases, an access request comprising an identifier of a given one of the plurality of databases in the database cluster and single sign-on credentials for the given client to access the database cluster;

authenticating, at the single sign-on manager, the single sign-on credentials in the access request; and responsive to authenticating the single sign-on credentials in the access request, establishing a connection between the given client and the given one of the plurality of databases in the database cluster utilizing a session established between the single sign-on manager and the given one of the plurality of databases in the database cluster;

wherein authenticating the single sign-on credentials in the access request comprises, responsive to determining that (i) the given client has an active connection managed by the single sign-on manager for at least one of the plurality of databases in the database cluster other than the given one of the plurality of databases in the database cluster and (ii) that the single sign-on credentials in the access request match single sign-on credentials utilized for the active connection managed by the single sign-on manager for said at least one of the plurality of databases in the database cluster other than the given one of the plurality of databases in the database cluster, bypassing at least a portion of a challenge-response protocol that would otherwise be carried out between the given client and the single sign-on manager; and wherein the method is performed by at least one processing device comprising a processor coupled to a memory.

19. The method of claim 18 wherein authenticating the single sign-on credentials in the access request comprises:

determining, utilizing a repository of cached information for active connections managed by the single sign-on manager, whether the given client has any active connection managed by the single sign-on manager for any of the plurality of databases in the database cluster other than the given one of the plurality of databases in the database cluster; and responsive to determining that the given client does not have any active connection managed by the single sign-on manager for any of the plurality of databases in the database cluster other than the given one of the plurality of databases in the database cluster, performing the challenge-response protocol between the given client and the single sign-on manager to authenticate the given client.

20. The method of claim 18 wherein establishing the connection between the given client and the given one of the plurality of databases in the database cluster comprises:

determining whether there is an existing validated session between the single sign-on manager and the given one of the plurality of databases in the database cluster;

responsive to determining that there is an existing validated session between the single sign-on manager and the given one of the plurality of databases in the database cluster, establishing the connection between the client and the given one of the plurality of databases in the database cluster utilizing the existing validated session; and responsive to determining that there is no existing validated session between the single sign-on manager and the given one of the plurality of databases in the database cluster:

creating a new validated session between the single sign-on manager and the given one of the plurality of databases in the database cluster; and establishing the connection between the given client and the given one of the plurality of databases in the database cluster utilizing the new validated session.

* * * * *